C. E. FOSTER.
ELECTRICAL MEASURING INSTRUMENT.
APPLICATION FILED SEPT. 11, 1916.
1,375,837.
Patented Apr. 26, 1921.
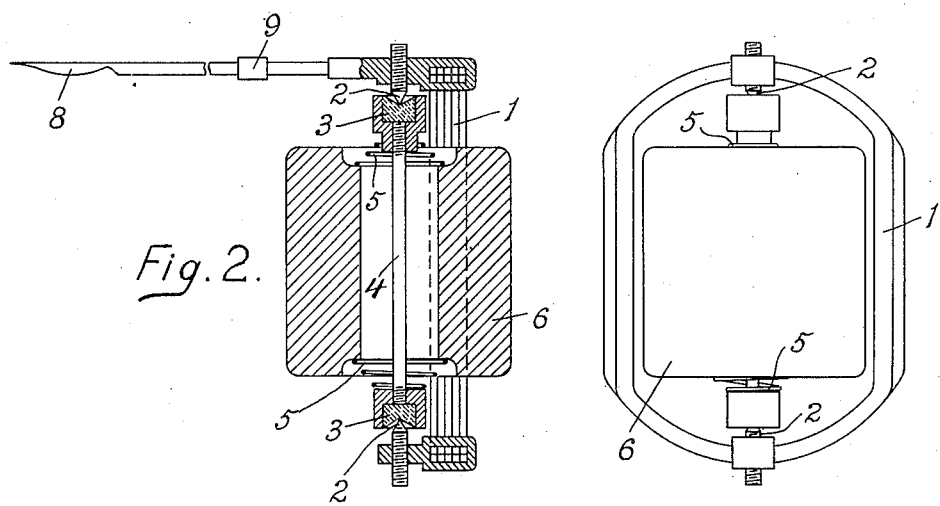
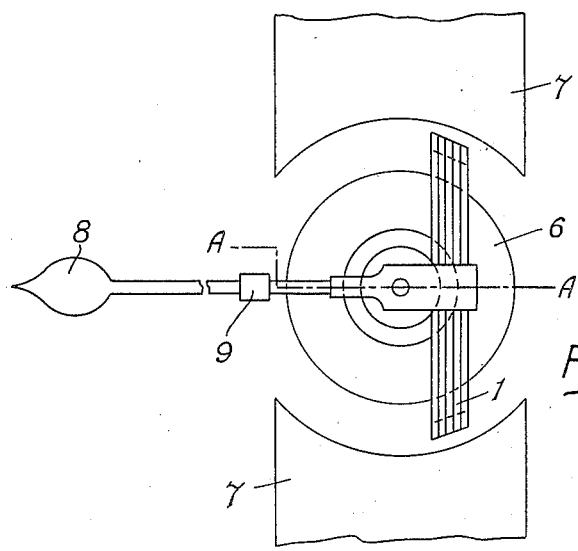

C. E. FOSTER.
ELECTRICAL MEASURING INSTRUMENT.
APPLICATION FILED SEPT. 11, 1916.
1,375,837.
Patented Apr. 26, 1921.
2 SHEETS—SHEET 2.
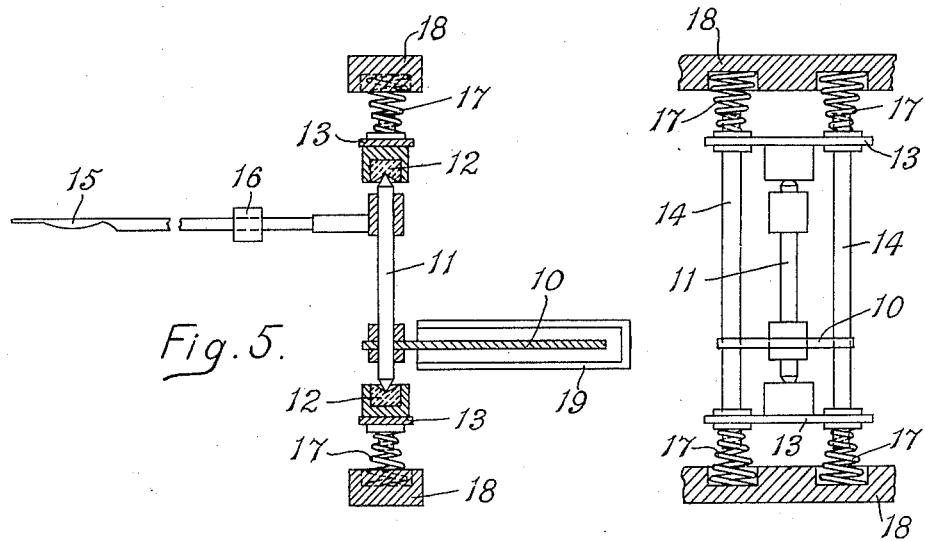
Fig. 5.
Fig. 6.
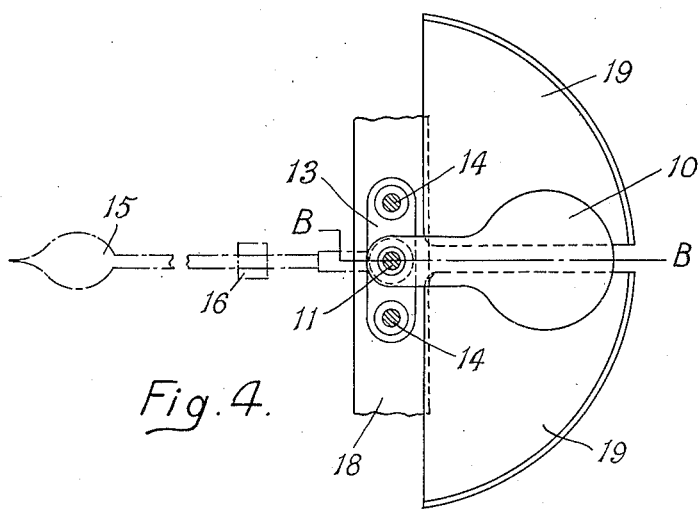
Fig. 4.

UNITED STATES PATENT OFFICE.

CHARLES EDWIN FOSTER, OF LETCHWORTH, ENGLAND.

ELECTRICAL MEASURING INSTRUMENT.

1,375,837.　　　　　　　　Specification of Letters Patent.　　Patented Apr. 26, 1921.

Application filed September 11, 1916. Serial No. 119,494.

*To all whom it may concern:*

Be it known that I, CHARLES EDWIN FOSTER, a subject of the King of Great Britain, and resident of Letchworth, England, have invented certain new and useful Improvements in Electrical Measuring Instruments, of which the following is a specification.

This invention relates to improvements in electrical measuring instruments, and has reference to instruments wherein the indicating needle is supported upon needle points which pivot in jewel bearings.

It is not unusual for these jewel bearings to be spring mounted in order to avoid damage to the needle point or jewel due to vibrations and shocks, but hitherto where spring mountings have been adopted the jewels have been separately mounted and the result has been that although the spring mounting of one jewel has seemed to take the shock, there has been a tendency of the needle point at the other end to leave its jewel or get out of alinement, and subsequently to suffer damage due to shock on the rebound.

The object of the present invention is to obviate this difficulty and incidentally to lessen the total weight of the needle and coil by eliminating the usual counter weight for balancing the needle.

The invention consists primarily in providing the jewels of electrical measuring instruments positively connected together by a shaft or bridge so that they must both move together and providing the shaft or bridge with springs so that shocks due to vibration in any direction will be taken up, but the relative positions of the jewels to the needle points will never alter. According to the preferred construction, the needle of the instruments involving the foregoing characteristic, is pivoted in such a position that the operative part of the moving system itself acts as the counterbalance weight, a small movable weight in the forward part of the needle being provided as is usual where this method of balance is adopted, for purposes of final adjustment.

In the accompanying drawings I have illustrated examples of the practical application of my invention.

In these drawings Figure 1 is a plan view of the indicating needle and its associated parts of a moving coil permanent magnet instrument of the well known D'Arsonval type having inwardly turned pivots.

Fig. 2 is a sectional view thereof, on line A—A of Fig. 1, Fig. 3 is an end elevational view thereof. The magnet poles are omitted from Figs. 2 and 3 for the sake of clearness.

Fig. 4 is a sectional plan view of an electro-static instrument having outwardly turned pivots, showing the application of my invention thereto.

Fig. 5 is a sectional view on line B—B of Fig. 4.

Fig. 6 is a sectional end elevation of Fig. 5, certain parts being removed for clearness.

Referring to these drawings and particularly to Figs. 1, 2 and 3, the moving coil 1 has attached to it the inwardly turned pivots 2. These bear in conical jewels 3 which are mounted upon a connecting post or staff 4. The whole system is "floating" and is sustained by the conical spiral springs 5, so that any jar or vibration is prevented from causing a blow between the points of the pivots 2 and their seatings in the jewel 3. The conical springs 5 are mounted upon the ends of the soft iron core 6. This core is placed between the magnet poles 7 so that the coil moves in the magnetic field established between the magnet poles 7 and the core 6. In the preferred construction the current is led into and out of the moving coil by the use of spiral springs not shown in the drawing. These spiral springs also serve to oppose and limit the movement of the coil about its axis under the influence of the current flowing.

In the arrangement illustrated in Figs. 1, 2 and 3, the moving coil is mounted eccentrically with reference to the axis 4 of the movement so that it balances approximately the weight of the indicating needle or pointer 8 thus dispensing with the necessity for the commonly used counter weight. For the purpose of final adjustment of balance a small sliding weight 9 is mounted upon the pointer so as to be adjustable to any position along it.

Referring to Figs. 4, 5 and 6, the moving vane 10 is carried upon the central post 11. This post or staff 11 has outwardly turned pivots at each end. The pivots bear in the conical jewels 12. The jewels are carried upon the bridge pieces 13. The bridge pieces are connected by the supports 14. The pointer 15 with the counter-weight 16 is also attached to the central post or staff 11 and the whole moving system is borne upon the springs 17. These springs 17 are seated in recesses in two plates 18. The vane 10 moves between the surfaces of two quadrants 19 which are differently charged electro-statically from each other and also from the moving system, thus the vane 10 tends to turn the whole moving system about the axis 11.

It will of course be understood that the invention which has been described in connection with simple indicating instruments is equally applicable to recording instruments in which some record is left of the successive deflections of the indicating needle or pointer, or to any other form of instrument in which the electrical force is used to cause a partial rotation of some part of the mechanism such as a relay, for instance.

Moreover the invention which has been illustrated, only, as applied to the D'Arsonval and electro-static types of instrument, is equally applicable to dynamometer instruments in which the operative forces are established between fixed and moving coils and to the moving iron instruments in which a piece of soft iron is attracted by the magnetic field from a fixed coil.

What I claim and desire to secure by Letters Patent is:—

1. An electrical measuring instrument comprising a magnet, a core member revolubly mounted between the pole pieces of said magnet, a spindle for supporting said core member, jeweled pivot bearings engaging the extremities of said spindle, a positive connection between said jeweled pivot bearings adapted to hold said bearings in fixed relation to each other, springs for supporting said spindle which springs are so arranged as to constitute the sole lateral support of said spindle and core member, and a pointer supported by said spindle and adapted to turn therewith.

2. An electrical measuring instrument comprising a soft iron core having a central hole enlarged at its ends to form shoulders, jewel bearings positively connected together by a rod located in the central hole, a conical spiral spring interposed between each of the jewel bearings and the adjacent shoulder formed on the core and providing the sole lateral support for said bearings, a moving system consisting of a moving coil, and a pointer connected to the coil, and pivotal supports located between the coil and the pointer for pivotally supporting the moving system, substantially as specified.

In testimony whereof I affix my signature in presence of a witness.

CHARLES EDWIN FOSTER.

Witness:
A. W. ROUNTER.